United States Patent [19]

Coutarel

[11] Patent Number: 4,714,380
[45] Date of Patent: Dec. 22, 1987

[54] APPARATUS TO MANEUVER CABLES OR CONDUITS PASSING OVER A DIRECTION CHANGER

[75] Inventor: Alain Coutarel, Paris, France
[73] Assignee: Coflexip, Paris, France
[21] Appl. No.: 850,547
[22] Filed: Apr. 11, 1986

[30] Foreign Application Priority Data

Apr. 11, 1985 [FR] France ................... 85 05440

[51] Int. Cl.⁴ .................. B23B 35/04; F16L 1/00
[52] U.S. Cl. .................. 405/168; 405/166; 242/54 R
[58] Field of Search ............. 405/168, 169, 170, 171, 405/158; 242/54 R, 158 R; 226/24, 25, 172

[56] References Cited

U.S. PATENT DOCUMENTS

| | | | |
|---|---|---|---|
| 3,641,778 | 2/1972 | Gibson | 405/168 |
| 3,776,516 | 12/1973 | Daniel | 254/190 R |
| 3,822,559 | 7/1974 | Matthews | 405/168 X |
| 3,982,402 | 9/1976 | Lang et al. | 405/168 |
| 4,243,345 | 1/1981 | Cha et al. | 405/168 |
| 4,410,297 | 10/1983 | Lynch | 405/168 X |

FOREIGN PATENT DOCUMENTS 550729 9/1956 Belgium .
2327660 5/1977 France .
742272 12/1955 United Kingdom .

*Primary Examiner*—Dennis L. Taylor
*Attorney, Agent, or Firm*—Charles W. Fallow; Martin P. Hoffman; Mitchell B. Wasson

[57] ABSTRACT

A maneuvering apparatus for lines such as cables or flexible conduits passing over a direction changing means and having thereon at least one rigid outer accessory with a diameter greater than that of the conduit or cable. The maneuvering apparatus is mounted adjacent the direction changing means, has a retainer and support for the accessory mounted on the conduit, and is moveable with respect to the direction changing means, so that the retainer follows a trajectory outside the direction changing means, from a first position in which the cable accessory is picked up by the retainer upstream from the direction changing means, to a second position in which the accessory is located downstream from the direction changing means and freed from the retainer.

11 Claims, 12 Drawing Figures

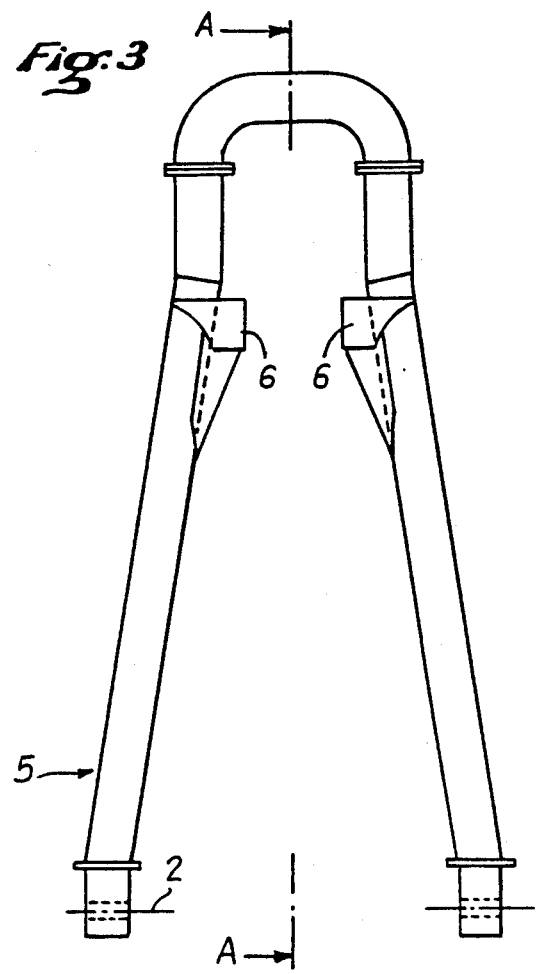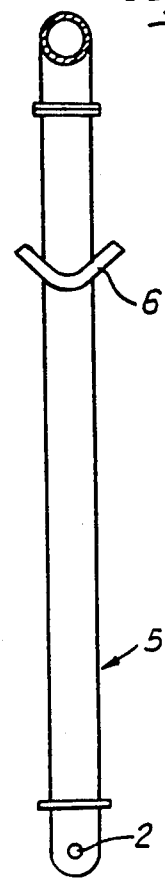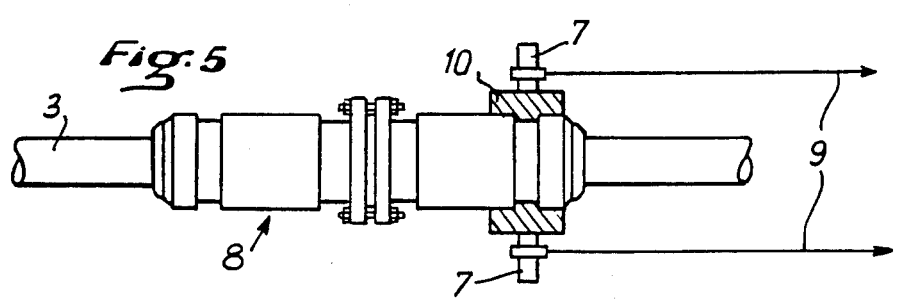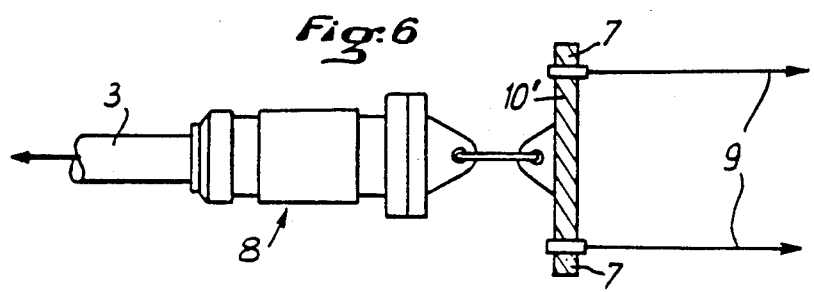

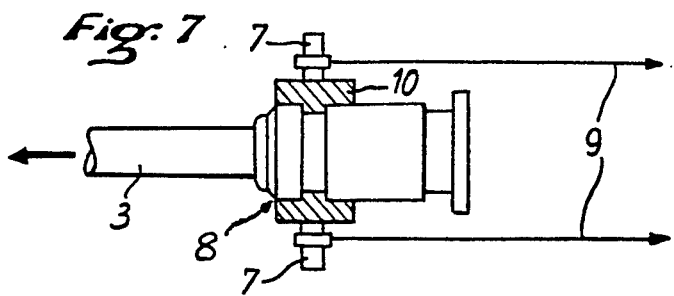
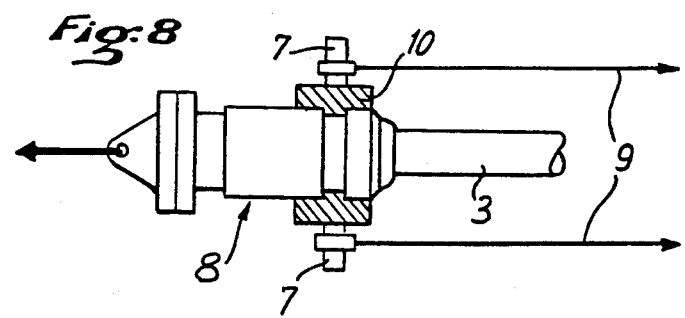
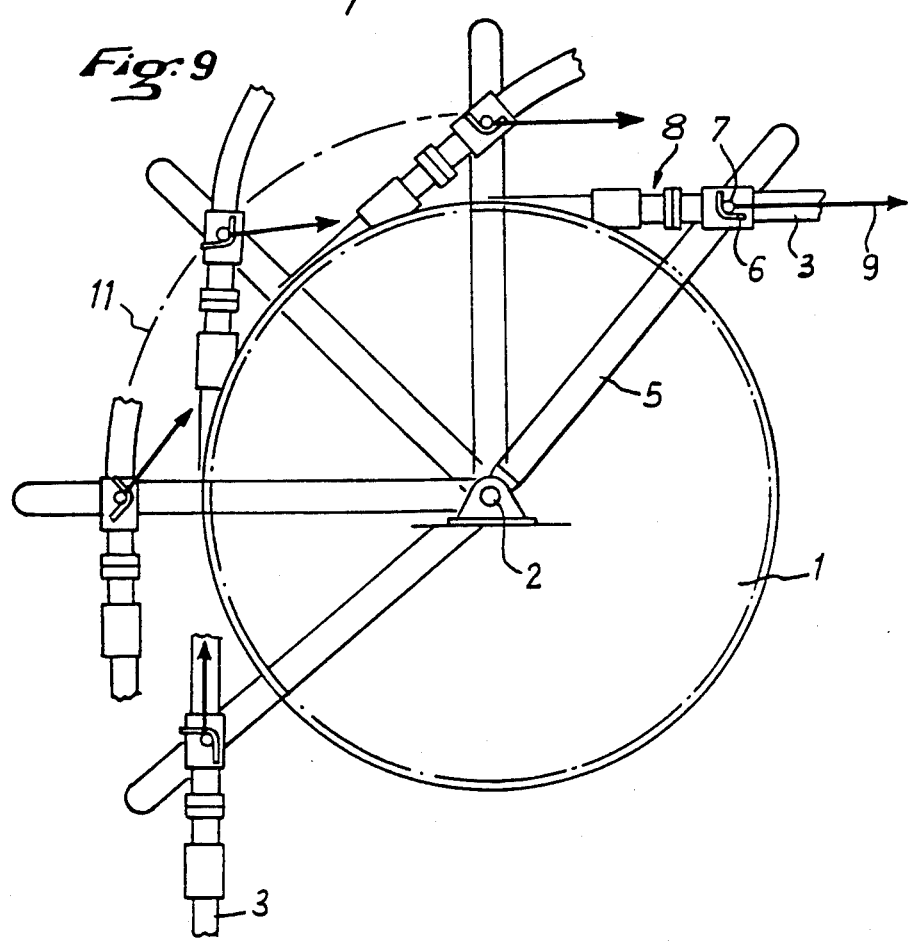

APPARATUS TO MANEUVER CABLES OR CONDUITS PASSING OVER A DIRECTION CHANGER

The present invention relates to apparatus for handling or maneuvering cables or flexible tubular conduits passing over a direction changing means or guide. The invention is particularly applicable to the laying or raising of submerged cables or conduits, with or without burial in the submarine floor. For the sake of clarity in description, the product to be laid will be designated as a conduit, although this term will in no way be limiting.

BACKGROUND OF THE INVENTION

During an operation in which a flexible conduit is being laid in the sea, it is usually unwound from a surface ship which advances in conjunction with the laying, the conduit coming to rest on the bottom or being buried in it by a conduit burying apparatus moving along the bottom.

The conduit is stored on the ship on one or more storage means or devices, such as winches, reels, baskets, or containers, etc . . . from which it is unwound.

Applicant's Assignee Company has described in its French patent No. 79 08 774 a motorized winch apparatus on which can be placed the reels to unwind or wind up such conduits, particularly for conduit laying or raising.

During laying of conduit, or of course, raising, the tension or strain due to the weight of the conduit suspended from the conduit laying ship is normally taken up by various currently used means such as winches, motorized bearings or blocks, or linear traction devices, such as linear winches with grippers, and of course, caterpillar type pullers.

Clearing the edge of the ship, generally at the stern, can be achieved in various ways, for example, by causing the flexible tubular conduit to pass over a direction changing guide or deviator such as a fixed or movable channel or chute with or without rollers, or a grooved wheel.

In view of the evolution of current techniques at greater and greater depths, numerous problems occur.

The increase in depth of water and/or the use of conduits of significant weight lead to greater and greater forces which can damage the conduit when it flexes, especially while it is passing over the direction changing means in the form of a channel or grooved wheel used to clear the side of the ship. On the other hand, the conduit always has along its length rigid exterior accessories with a diameter greater than that of the conduit and which constitute singular points or spaced apart locations which, when they pass over the direction changing means, embed themselves more or less in this latter and cause in the conduit constraints of flexion under traction, which cannot be absorbed without damage to the conduit.

Among the different such points which could be encountered can be cited the connectors located at the ends of the conduits or in the running portions for the connection of successive sections, and anodes, manouevering rings, devices for limiting curvature, stiffeners, etc . . .

To attempt to overcome these disadvantages, it has already been proposed, when the traction on the conduit is not too great, that there be placed, especially to help the intermediate connectors clear the direction changing means, a shoe or "sock" located on the conduit, below the connector, and put in tension by retention means such as slings operated by a winch on the deck of the ship. Thus, the connector is flexed without traction on the direction changing means. Such a technique quickly becomes unacceptable with increasing tension stresses in the conduit as a result of the insufficient hold of the shoe or sock and risk of damage to the outer coating or sheath of the conduit.

To attempt to resolve this problem, it has been proposed that there be mounted concentrically around the flexible conduit, articulated rings with a diameter equal to the outer diameter of the accessory constituting the singular point, the radius of the rings decreasing progressively on each side of the accessory toward the diameter of the flexible conduit.

Such a solution leads to obstructions and high costs, and, moreover, cannot be used when the radius of the wheel or the channel constituting the direction changing means is close to the minimum radius of curvature of the flexible conduit.

SUMMARY OF THE INVENTION

The present invention provides a manoeuvering or handling apparatus which can be used particularly for the laying or placement of flexible conduits, while avoiding the disadvantages mentioned above and allows the laying or the raising of great lengths of flexible conduits and the passing of accessories of various types mounted on the conduit over the direction changing means without creating in the conduit, localized flexions which, combined with the axial load, can cause damage to the conduit.

The apparatus according to the invention is characterized by the fact that it includes a manoeuvering or handling means mounted on or in the immediate vicinity of the direction changing means, the handling means including a catch or retainer for supporting an accessory mounted on the conduit, and being movable with respect to the direction changing means so that the supporting retainer follows a preferably circular trajectory, outwardy of the direction changing means, from a first position in which the accessory of the conduit is supported by the supporting retainer of the handling means, above or upstream of the direction changing means, especially with the conduit essentially in a horizontal position, to a second position in which the accessory is located below or downstream of the direction changing means and can be released from the supporting retainer of the handling means, particularly with the conduit in an essentially vertical position. The apparatus also including means for taking up the tension in and supporting the conduit during the displacement of the handling apparatus between its first and second positions.

In a first embodiment, the handling apparatus comprises a pivoting crossbar which straddles the direction changing means.

When the direction changing means is a wheel or a channel with an outer circular support surface, the pivot axis of the crossbar is merged with the axis of the direction changing means.

The crossbar may or may not be motorized. In the non-motorized version, the weight of the conduit during the passage of the accessory over the direction changing means is borne in the usual way by slings fastened to the accessory and released when the handling means has reached the second position mentioned above.

In the motorized version, the stresses of tension, i.e. the weight of the conduit, is taken over at the level of the swing axis of the crossbar by the motor or drive system, which can advantageously comprise an hydraulic motor driving a gear connected to the crossbar.

In a second embodiment, the handling means comprises a carriage able to roll on a track parallel to the outer support surface of the direction changing means, which carriage can be motorized or operated by a cable.

Retention or support of the accessory on the handling means between the first and second positions mentioned above can advantageously be achieved by tranverse pivot pins, provided on the accessory or on the maneuvering collar attached to the accessory, or on a part connected to the accessory. The pins are able to be received in support brackets or bearings on the handling means, on either side of the conduit, and which retain and support the pins while the accessory passes over the direction changing means.

It will be understood that the present invention can also be used for the passage of accessories at the ends of the conduit as well as for accessories distributed along its length, the apparatus also being perfectly reversible and providing for the raising of a conduit, the clearing of the direction changing means by an accessory then being accomplished along the same trajectory as for the laying, but going from an initial position in which the conduit is essentially vertical to a final position in which it is essentially horizontal.

In order to make the invention better understood, several embodiments will now be described as non-limiting examples with references to the attached drawings.

BRIEF DESCRIPTION OF DRAWINGS

FIG. 3 is a view in front elevation of a handling means in the form of a pivoting crossbar of the apparatus according to the invention;

FIG. 4 is a view in section taken along line A—A of FIG. 3;

FIG. 5 shows a section of conduit provided with an intermediate connector and equipped with means for its maneuvering by the apparatus according to the invention;

FIG. 6 is a view similar to FIG. 5 showing a mounting for a rearward end connector of a conduit;

FIG. 7 shows a variation of the mounting of FIG. 6;

FIG. 8 is a view similar to FIG. 7, showing a mounting for a front end connector;

FIG. 9 shows the operation of the apparatus according to the invention for the passage of an accessory in the form of an intermediate connector, equipped with a mounting like FIG. 5;

DETAILED DESCRIPTION

Figure 1:
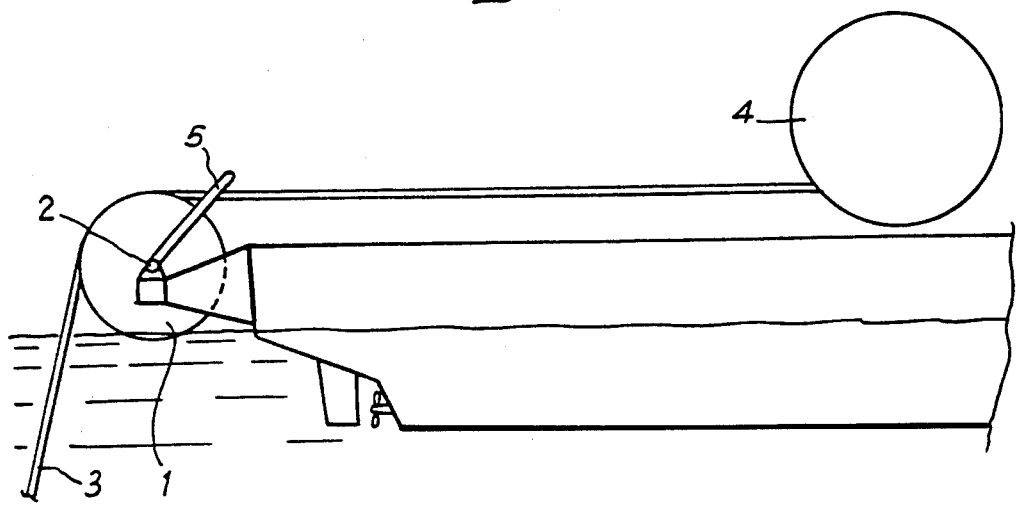
FIG. 1 is a very schematic view in side elevation of the apparatus according to the invention mounted on the stern of a ship for laying conduit in the ocean.

Reference will first be made to FIGS. 1 to 4 which show a first embodiment of the apparatus according to the invention. The apparatus is mounted on the stern of a ship for laying conduit including, in the example shown, a direction changing or guiding means in the form of a grooved wheel 1 mounted to rotate around an axis 2. A conduit 3 engages in the groove and extends over and partly around the wheel, so the curvature of the conduit is limited, as it changes direction from horizontal to generally vertical. The conduit 3 is unwound from a reel 4, mounted on and controlled by a motorized winch or similar device. The apparatus is associated with a conventional device, not shown, for linear traction of the conduit, especially one in the form of opposed caterpillar tracks mounted on the deck of the conduit laying ship.

The apparatus according to the invention includes a crossbar designated overall by 5 mounted to swing or pivot around axis 2 so as to straddle wheel 1.

As can best be seen at FIGS. 3 and 4, crossbar 5 has on each of its legs, support bearings or brackets 6, in the form of forks or a "V", able to receive and retain, as will be described later, transverse pivot pins 7 connected to an accessory such as a connector 8 mounted on conduit 3. As will be explained later, pivot pins 7 are preferably located on a maneuvering collar 10 (FIG. 5) fastened to accessory 8. Slings shown schematically at 9 on FIG. 2 can be attached to the collar.

FIGS. 5 to 8 show different forms of mountings or connections for connecting pivot pins 7 to a connector 8.

FIG. 5 shows the mounting of a maneuvering collar 10 on one end of an intermediate conduit connector. In FIG.. 6, pivot pins 7 are part of a component 10' hooked to the end of a conduit rear connector.

FIG. 7 shows the mounting of a collar 10 on a rear connector of a conduit and FIG. 8 shows a similar mounting of a collar 10 on a head or front connector of a conduit.

Reference will now be made to FIG. 9 which shows the operation of the apparatus according to FIGS. 1 to 4 using a mounting similar to that of FIG. 5.

The laying or placement operation using the apparatus according to the invention is carried out as follows. Before the accessory, particularly connector 8, reaches the tension control mechanism, which can be in the form of opposed caterpiller tracks, a maneuvering collar 10 or a device 10' is placed in one of the manners shown on FIGS. 5 to 8, depending of the type of connector, and slings 9 are attached to an auxiliary handling winch (now shown) for taking up tension and supporting the conduit. The slings in practice are short and are themselves connected by means such as a triangle plate to a handling cable connected to the auxiliary winch.

Pivot pins 7 of collar 10 or part 10' connected to connector 8 then enter and are supported by the U or V shaped support bearings 6, forming means for supporting and retaining the pivot pins 7 on the pivoting crossbar 5 which then rotates or swivels between a first position shown to the right on FIG. 9 in which conduit 3 is essentially horizontal, and a second position shown at the lower left on FIG. 9 in which conduit 3 is essentially vertical.

The retaining or connecting means 6 on the legs of the crossbar are so positioned that during the rotation of the crossbar, connector 8 is spaced outwardly of the periphery of wheel 1, so as to avoid unacceptable flexion of the pipe downstream of connector 8. During the rotation of crossbar 5 between the two extreme positions, it will be seen that retaining means 6 follow a circular trajectory 11 concentric to wheel 1 but spaced outwardly from the wheel. Slings 9 which take up the tension of the cable during the rotating phase of the crossbar are shown schematically on FIG. 9.

Figure 2:
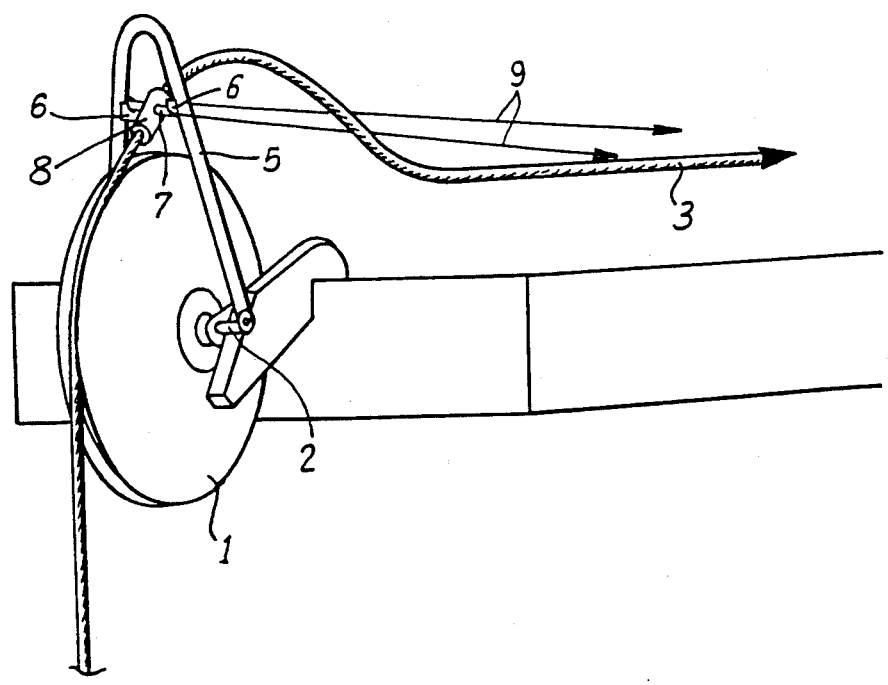
FIG. 2 is a schematic perspective view of the apparatus of FIG. 1.
Figure 10:
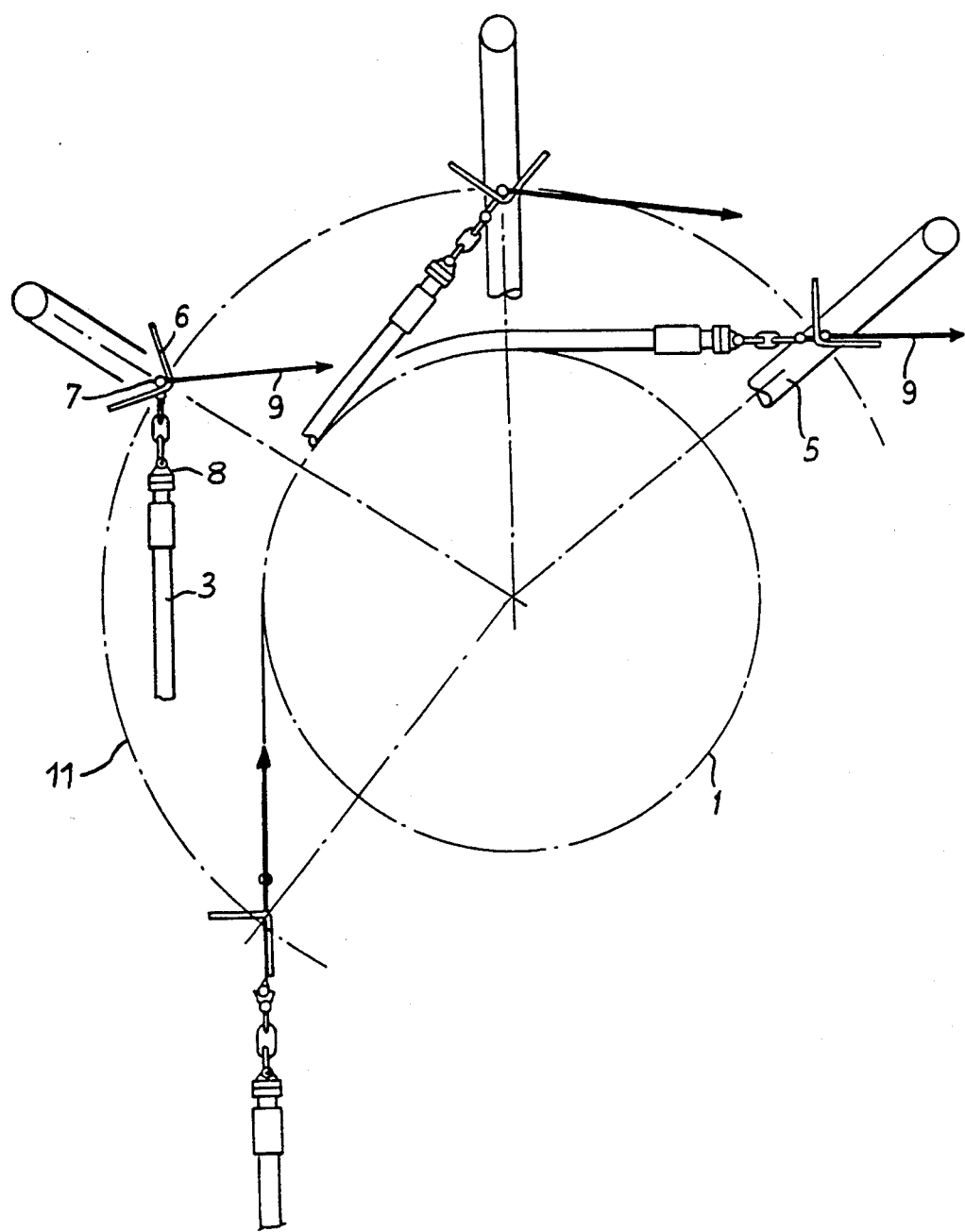
FIG. 10 shows the use of the apparatus according to the invention for the passage of a rear connector equipped with the mounting of FIG. 7.

FIG. 10 is a view similar to FIG. 2 showing the rotating phase of the crossbar between its extreme positions using the mounting shown on FIG. 6.

Figure 11:
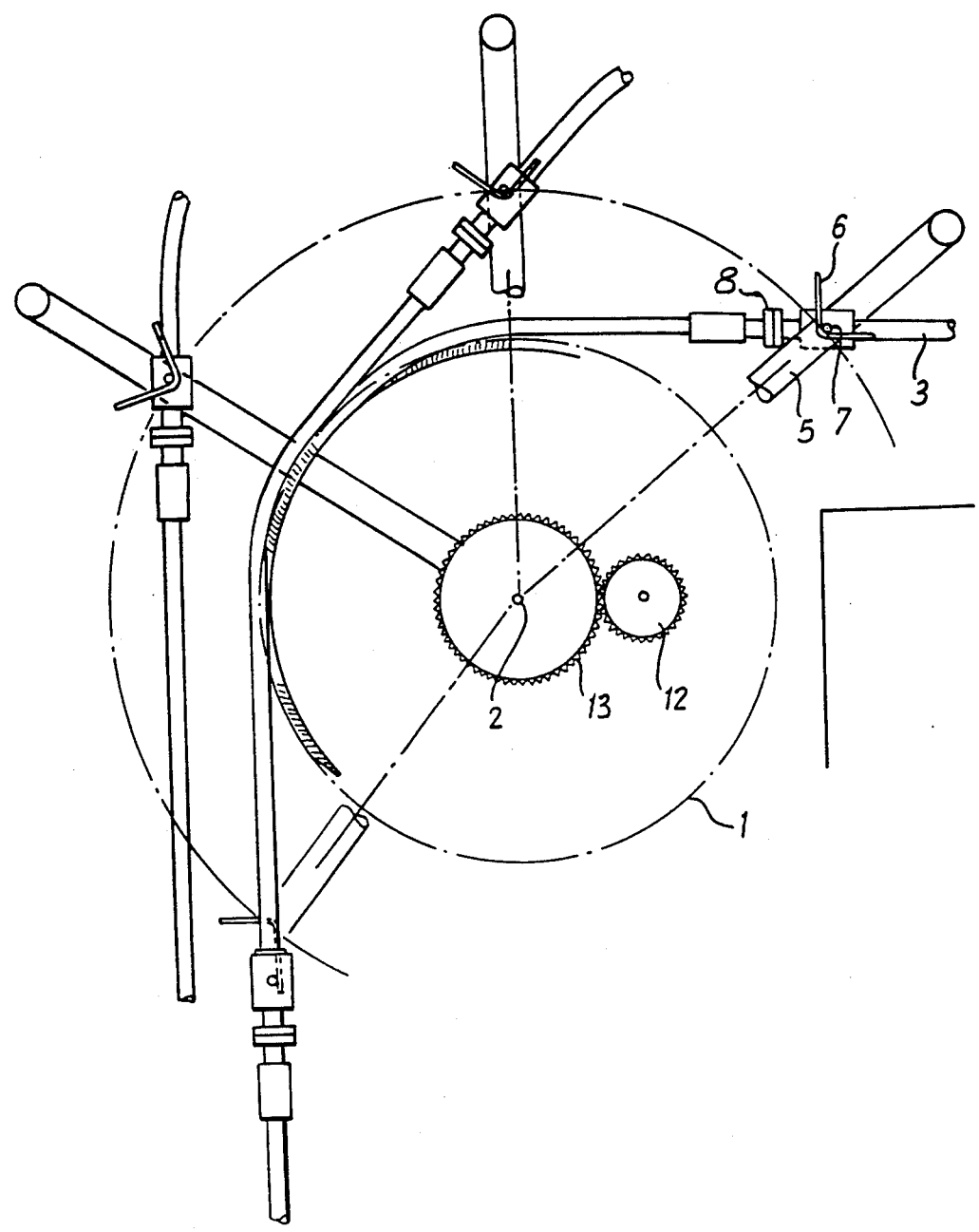
FIG. 11 shows a variation of the handling means of the apparatus according to the invention and, FIG. 12 shows another embodiment of the handling means according to the invention.

FIG. 11 shows the operation of an apparatus including a modified arrangement, in which the crossbar is motorized or driven. The drive arangement includes an output drive gear of a reversible hydraulic motor 12 meshing with a gear 13 centered on axis 2. Gear 13 is fixed to the crossbar so that the crossbar is turned when motor 12 is operated.

It will be understood that in this case, tension take-up slings 9 are no longer necessary, the stresses of tension during the movement of the crossbar being born by the drive assembly.

Figure 12:
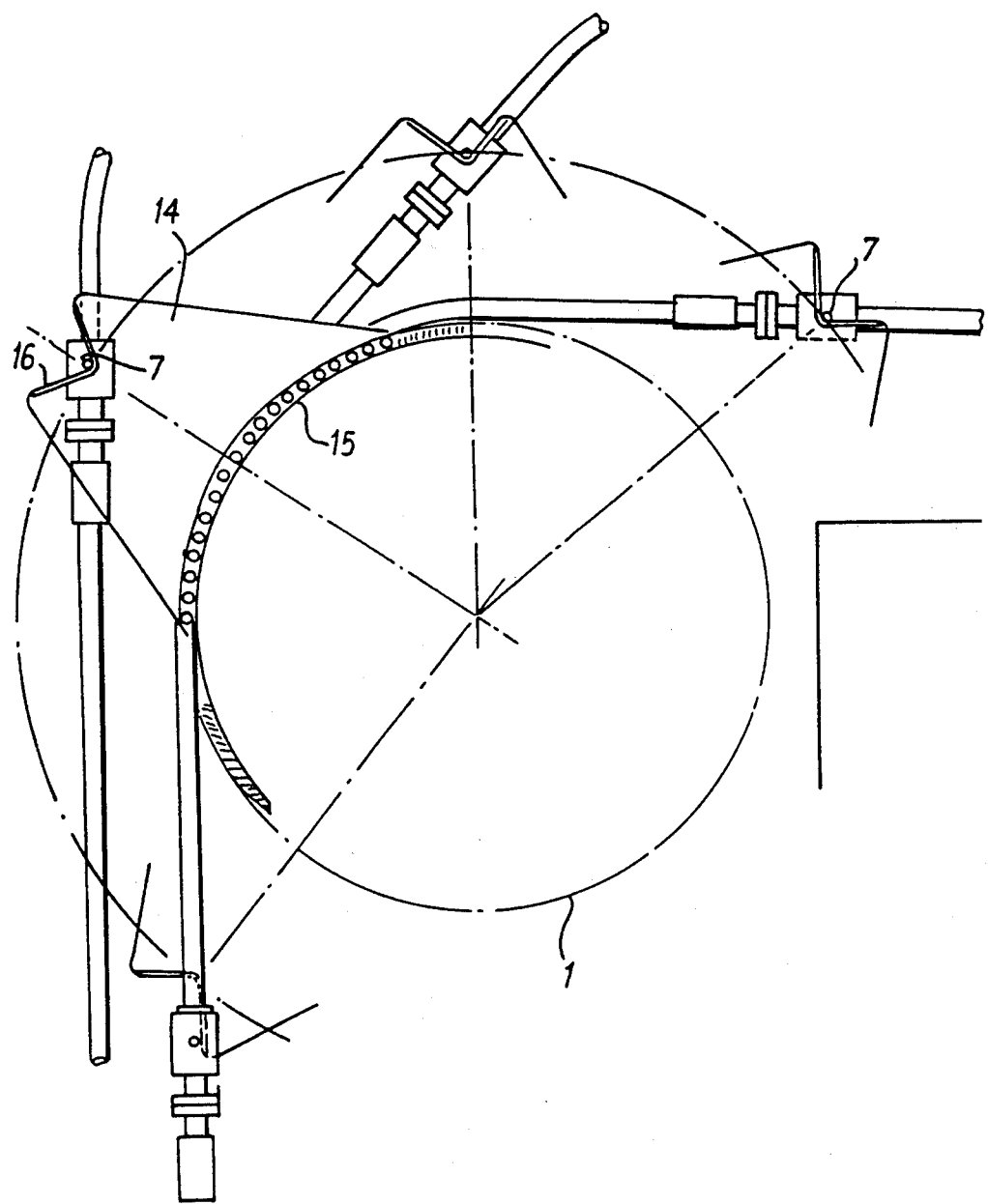

FIG. 12 shows another embodiment in which the handling means takes the form of a carriage 14 movably mounted particularly under the action of a motor (not shown), or by a cable, on a roller track 15 on the periphery of direction changing wheel 1.

In one variation, the carriage can be mounted for free rotation, the tension in the conduit then being taken up by the slings.

For the reception of pivot pins 7, the supports of carriage 14 have at their outer ends a notch 16 defining a reception recess and forming a support bearing for the corresponding pivot pin.

In the several embodiments described above, it is to be noted that the effect of the crossbar apparatus is to maintain a straight section of an accessory, such as a connector end 8, spaced outwardly of the periphery of a curved direction changing guide, such as a grooved wheel, so this straight section can remain straight as it passes around the guide, from a horizontal to a generally vertical position (and vica-versa). Localized bending of the conduit and the connector or other accessory, is thus avoided.

In operation of the several embodiments, the crossbar 5, when the conduit is layed, is placed in an angular position such that its retention and support bracket (6 or 16) is in the path of travel of pivot pins 7, as shown for example at FIG. 9. The bracket then picks up the pins to maintain the connector 8, or other accessory, spaced outwardly of the periphery of the wheel or similar direction changing guide. Release of the pins 7 from the bracket also occurs without intervention since the bracket becomes inverted after the crossbar rotates to the lower position shown at FIG. 9 so the pins are free to move downwardly with the conduit.

Although the invention has been described in connection with particular embodiments, it is of course in no way thereby limited and numerous variations and modifications can be made without exceeding either its scope or its spirit. Moreover, it should be clear that the invention is in no way limited to the application described and that it can be used in various fields in which it is necessary to relieve a direction changing means of a load, or an accessory mounted on a conduit subjected to tension stress.

I claim:

1. An apparatus for maneuvering a line such as a cable or flexible conduit having thereon at least one rigid outer accessory with a diameter greater than that of the line around a direction changing means over which the line is moved, said apparatus comprising, maneuvering means mounted adjacent said direction changing means, means for retaining the accessory on the maneuvering means, means mounting the maneuvering means for movement with respect to the direction changing means, so that said retaining means moves said accessory along a path outside a surface of the direction changing means which is engaged by the line, from a first position in which the accessory is picked up by the retaining means upstream from the direction changing means, to a second position in which the accessory is located downstream from the direction changing means and is released from said retaining means, and means for taking up the tension in the conduit during the movement of the maneuvering means between said first and second positions.

2. An apparatus according to claim 1, wherein the maneuvering means comprises a crossbar pivotable around an axis having arms which straddle the direction changing means.

3. An apparatus according to claim 2, wherein the direction changing means comprises a wheel or a channel with a circular outer bearing surface, and wherein the pivot axis of the crossbar coincides with the axis of the bearing surface of said direction changing means.

4. An apparatus according to claim 1, wherein the tension in the conduit during the movement of the accessory over the direction changing means is taken up by slings connected to the accessory and released when the maneuvering means has reached said second position.

5. An apparatus according to claim 2, wherein the tension is taken up by a drive system at the pivot axis of the crossbar.

6. An apparatus according to claim 1, wherein the maneuvering means comprises a carriage, a track parallel to an outer bearing surface of the direction changing means, an means mounting the carriage to roll on the track.

7. An apparatus according to claim 1, wherein the line is essentially horizontal in said first position.

8. An apparatus according to claim 1 wherein the is essentially vertical in said second position.

9. An apparatus according to claim 1 further comprising transverse pivot pins connected to the accessory, and the retaining means for retaining the accessory on the maneuvering means during movement between said first and second positions comprises, support bearings on the maneuvering means on either side of the line for receiving said pivot pins to support the line.

10. An apparatus according to claim 9 wherein said pivot pins comprise pivot pins on a maneuvering collar connected to the accessory.

11. An apparatus for passing an inflexible accessory, connected in a flexible line, around an arcuate member over which the line is moved under tension to change its direction, comprising
   means, mounted adjacent the arcuate member, for maneuvering the accessory,
   means for retaining and supporting the accessory on the maneuvering means,
   said maneuvering means being mounted with respect to said arcuate element in such a way that said retaining means moves the accessory along a path out of contact with said arcuate member from a first position in which the accessory is picked up by the retaining means, to a second position, located downstream from the arcuate member, in which the accessory is released therefrom, and
   means connected to said maneuvering means for resisting line tension.

* * * * *